US006998366B2

(12) United States Patent
Haake et al.

(10) Patent No.: US 6,998,366 B2
(45) Date of Patent: Feb. 14, 2006

(54) THIN LAYER CATALYSTS BASED ON RANEY ALLOYS, AND METHOD FOR THE PRODUCTION THEREOF

(75) Inventors: Mathias Haake, Mannheim (DE); Gerhard Dörsam, Ludwigshafen (DE); Helmut Boos, Edesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 151 days.

(21) Appl. No.: 10/168,981

(22) PCT Filed: Dec. 21, 2000

(86) PCT No.: PCT/EP00/13104

§ 371 (c)(1),
(2), (4) Date: Jun. 26, 2002

(87) PCT Pub. No.: WO01/47633

PCT Pub. Date: Jul. 5, 2001

(65) Prior Publication Data

US 2003/0004059 A1 Jan. 2, 2003

(30) Foreign Application Priority Data

Dec. 28, 1999 (DE) ................. 199 63 443

(51) Int. Cl.
*B01J 25/00* (2006.01)
*B01J 23/00* (2006.01)
*B01J 21/00* (2006.01)
*B01J 20/00* (2006.01)

(52) U.S. Cl. .................. 502/301; 502/305; 502/313; 502/314; 502/315; 502/316; 502/317; 502/318; 502/319; 502/320; 502/321; 502/322; 502/323; 502/327; 502/331; 502/335; 502/336; 502/337; 502/338; 502/346; 502/355; 502/414; 502/415; 502/439; 502/244; 502/245; 502/254; 502/255; 502/256; 502/257; 502/258; 502/259; 502/260; 502/263; 502/527.14

(58) Field of Classification Search ............... 502/301, 502/305, 313–323, 327, 331, 335–338, 346, 502/355, 414–415, 439, 244–245, 254–260, 502/263, 527.14
See application file for complete search history.

(56) References Cited

U.S. PATENT DOCUMENTS

| 3,637,437 | A | * | 1/1972 | Goldberger | 429/44 |
|---|---|---|---|---|---|
| 4,089,812 | A | * | 5/1978 | O'Hare et al. | 502/301 |
| 4,116,804 | A | * | 9/1978 | Needes | 204/284 |
| 4,503,251 | A |   | 3/1985 | Gray et al. | 564/450 |
| 4,584,065 | A | * | 4/1986 | Divisek et al. | 205/75 |
| 4,584,139 | A | * | 4/1986 | Gray et al. | 554/144 |
| 4,686,202 | A |   | 8/1987 | Broecker | 502/300 |
| 4,826,799 | A |   | 5/1989 | Cheng et al. | 502/301 |
| 5,010,050 | A | * | 4/1991 | Wullenweber et al. | 502/301 |
| 5,015,766 | A | * | 5/1991 | Kambara et al. | 564/127 |
| 5,536,694 | A | * | 7/1996 | Schuetz et al. | 502/301 |
| 6,262,307 | B1 | * | 7/2001 | Freund et al. | 564/416 |
| 6,337,300 | B1 | * | 1/2002 | Sauer et al. | 502/301 |
| 6,573,213 | B1 | * | 6/2003 | Ostgard et al. | 502/301 |

FOREIGN PATENT DOCUMENTS

| CA | 2 090 930 | 9/1993 |
|---|---|---|
| DE | 1 172 650 | 6/1964 |
| DE | 6 38 520 | 5/1988 |
| DE | 37 02 138 | 8/1988 |
| EP | 0 091 028 | 10/1983 |
| EP | 0 564 830 | 10/1993 |
| JP | 48 02 694 | 4/1973 |

OTHER PUBLICATIONS

Kayser et al. "Raney-Nickel Cathodes from A;-Mo-Ni Precursor Alloys for Alkaline Water Electrolysis" Z. Metallkd. vol. 83 No. 7 (1992) pp. 565-568.

* cited by examiner

*Primary Examiner*—Cam N. Nguyen
(74) *Attorney, Agent, or Firm*—Novak Druce & Quigg

(57) ABSTRACT

Raney alloy catalysts applied to a support are described, said catalysts having an extremely thin layer of Raney alloy with a thickness of 0.01 to 100 μm. These catalysts are prepared by vapor deposition of the appropriate metals under reduced pressure. They are generally suitable for all known hydrogenation and dehydrogenation reactions and are extremely abrasion-resistant.

22 Claims, No Drawings

THIN LAYER CATALYSTS BASED ON RANEY ALLOYS, AND METHOD FOR THE PRODUCTION THEREOF

The present invention relates to the field of heterogeneous catalysis. More precisely, the present invention relates to heterogeneous catalysts based on Raney alloys applied to knitted or woven fabric tapes.

Raney alloys as they are known, especially Raney nickel, have been known for a long time as heterogeneous catalyst systems. They are used for hydrogenations or dehydrogenations. These alloys are intermetallic phases, for example, in the case of Raney nickel, phases with the composition $Ni_2Al_3$ or $NiAl_3$. Conventionally these alloys are used in the form of fine powders suspended in the solution in which the reaction is carried out. The aluminum is dissolved out by treatment with lyes to give a very active Ni catalyst.

Raney nickel, in particular, is a very active catalyst for hydrogenations or dehydrogenations, although there are a number of disadvantages arising from the powder form of the catalyst. Thus, one is often confronted with problems of catalyst distribution in the reactor; also, the residence times of the reactants in the reactor are frequently critical. In addition, when the reaction is complete, the powder has to be separated off, generally by filtration, which demands an elaborate and expensive work-up technology.

For this reason, attempts have been made to prepare fixed bed catalysts which contain typical Raney nickel alloys, but not in powder form. In the simplest case, shaped articles are produced from the fine suspension powders.

This is described for example in U.S. Pat. No. 4,826,799, where an alloy powder is mixed with polyethylene and a binder and compressed to shaped articles in screw extruders. In the subsequent calcination step, the required intermetallic phases are formed and the polyethylene is burnt off at the same time to give solid strands which are suitable as a hydrogenation catalyst, especially for the hydrogenation of toluene.

Another possibility is to prepare catalysts in which a Raney alloy surface is applied to a woven fabric.

This is described for example in EP-A-91 028, which discloses catalysts with fabric components having an integrated Raney nickel surface. These catalysts are prepared by providing nickel-containing fabrics with an aluminum layer, the latter preferably being applied by immersing said fabrics in aluminum melts at 600 to 700° C. The aluminum layer has a thickness of at least 100 μm, preferably 150 μm. The catalysts are used in the hydrogenation of aromatic amines.

In "Commercial Application of Cathode Coatings in Electrolytic Chlorine Cells", T. A. Liederbach et al. describe the production of nickel electrodes in the form of wire gauzes or sheets by electroplating. In this process, nickel and zinc are deposited electrolytically from a solution containing ions of these metals. Electrodes of similar performance characteristics are obtained from metal powders by the plasma spray process. Typical thicknesses of the catalytically active layer are 250 to 300 μm. Electrodes of this type are employed in chlor-alkali electrolysis.

DE-A-37 02 138 discloses electrodes produced from Raney nickel powders. These powders are intimately mixed with another alloy, used to store $H_2$, and with poly-tetrafluoroethylene powder. The resulting mixture is processed to a coherent network by compression and rolling. An alternative possibility is to compress the mixture onto an expanded metal to give electrodes with a layer thickness of 1 mm. These electrodes are used for the storage and electrochemical scission of hydrogen.

Finally, U.S. Pat. No. 481,440 describes a Raney nickel electrode applied to a graphitized paper support. This support is coated by plasma coating with alloy powder to give layers with a thickness of 1 to 10 mm.

The Raney nickel catalysts described in the prior art generally exhibit a high hydrogenating activity, but their abrasion resistance is inadequate for some uses. This is the case, for instance, when colorless, optically clear liquids of high viscosity are subjected to hydrogenation or dehydrogenation reactions using Raney nickel catalysts. This often reveals abrasion originating from the Raney alloy catalyst. Depending on the type of this catalyst, the abraded material can be coarsely to finely particulate, as is the case for powder catalysts and catalysts obtained by the electrochemical deposition of metals. Even in the case of 1 mm thin layers on woven fabric, the abrasion of very fine particles is still observed, which may not be tolerable for all product requirements.

It is therefore an object of the present invention to provide Raney alloy catalysts which have a high hydrogenating activity and an extremely high abrasion resistance, even on contact with viscous liquids.

We have found that this object is achieved by Raney alloy catalysts applied to a support, wherein the Raney alloy layer has a thickness of 0.2 to 100 μm.

The catalyst generally takes the form of tape, film, woven fabric or knitted fabric. These catalyst tapes are preferably coated by electron beam vaporization under reduced pressure.

Different metals can be used according to the desired Raney alloy. Aluminum is used in every case. The other metal needed to prepare a Raney alloy is selected from the group consisting of nickel, cobalt and copper, nickel being preferred.

If desired, the metals can additionally contain one or more promoter metals, for example iron, chromium, molybdenum or boron.

To coat the support materials, the active component, i.e. aluminum, and the other metal used to prepare the desired Raney alloy, especially nickel, as well as the promoter metal if desired, are vaporized under reduced pressure and condensed uniformly onto the support. The vaporization is effected by the conventional methods known to those skilled in the art, for example by means of heat, by electron beam vaporization, by sputtering or by combinations of these methods. The coating is preferably carried out by electron beam vaporization. The condensation is preferably effected by the methods disclosed in U.S. Pat. No. 4,686,202 or EP564 830.

The resulting layers of vapor-deposited metal are extremely thin, being in the range 0.1 μm to 50 μm, preferably 1 μm to 10 μm, in the case of aluminum. The layer thicknesses of the other metals used to prepare the Raney alloy depend on the stoichiometry of the active Raney phase to be prepared. In the case of nickel, the metal layer has a thickness of 0.1 μm to 10 μm, preferably 0.5 μm to 5 μm.

The support can be coated in such a way that several layers of the metals used are applied alternately. Total layer thicknesses of approx. 100 μm are achieved in this way. These layer thicknesses are well below those achievable by the processes described in the prior art, which have values of about 100 to 15,000 μm. The catalysts according to the invention therefore have metal layers with an extremely low total weight ranging from approx. 1 to 20 g aluminum/$m^2$ fabric or 1 to 3 g nickel/$m^2$ fabric. These values also apply to cobalt and copper. The specific total weight of the resulting metal layers from which the Raney alloy is formed ranges from 0.1 to 10 g/$m^2$ fabric.

The support materials used are preferably metals, one reason for this being their advantageous mechanical properties. Another advantage, however, is the fact that they can be roughened prior to coating. This is effected by surface tempering, for which the metal supports are heated in an oxygen-containing atmosphere, for example air, over a period of 30 minutes to 24 hours, preferably 1 to 10 hours, the temperatures used being from 700 to 1100° C., preferably 800 to 1000° C. It has been found that the activity of the catalyst can be controlled by this kind of pretreatment.

Metals which are preferably used as support materials are stainless steels of material no. 1.4767, 1.4401, 2.4610, 1.4765, 1.4847 and 1.4301 (designation according to "Stahleisenliste", 8th edition, pages 87, 89 and 101, published by Verein deutscher Eisenhüttenleute, Verlag Stahleisen mbH, Düsseldorf 1990).

Other preferred metals for production of the support materials are iron, nickel or copper.

However, the list of materials suitable for the support is not restricted to metals. Inorganic materials or dielectrics can also be used instead of metals to produce the supports, examples being ceramic, aluminum oxide, silicon dioxide, preferably woven fabric made of asbestos substitutes, or combinations of these materials. Carbon fibers are also suitable. Organic plastics can also be used, examples of such materials being polyamides, polyesters, polyvinyl compounds, polyethylene, polypropylene and polytetrafluoroethylene. All these non-metallic materials are used in a similar way to the metals in the form of knitted fabrics, woven fabrics or films.

The catalyst tapes obtained by the process according to the invention have a metal layer consisting of the appropriate Raney alloy, which is completely homogeneous and forms neither pores nor particles.

Said materials are used as supports in the form of films, knitted fabrics or woven fabrics. In one preferred embodiment, the supports are corrugated or crimped, for example by gear rolling. The corrugations obtained preferably have a pitch of 0.5 to 10 mm.

The catalyst tapes obtained after coating still have to undergo a heat treatment in order to be able to form the active Raney alloy phases. In the case of Raney nickel, these phases can be expressed approximately by the formula $Ni_2Al_3$ or $NiAl_3$. The heat treatment is carried out at temperatures of 500 to 600° C. for 10 to 60 minutes under an inert gas atmosphere, examples of possible inert gases being nitrogen, argon or hydrogen.

In one variant of the invention, finished Raney alloys, preferably Raney nickel, can be vapor-deposited directly onto the support, thereby dispensing with the tempering step. The Raney nickel layer is preferably prepared by sputtering with a roll coater, the layer thicknesses of the resulting Raney alloys ranging from 1 $\mu$m to 50 $\mu$m and the preferred thickness being 1 $\mu$m.

The catalysts obtained according to the invention, applied to films or woven or knitted tapes, can be formulated by the conventional techniques into packings or monoliths which can advantageously be used in hydrogenations or dehydrogenations. A large number of different packing structures are known from distillation and mixing technologies, an example being canal structures for gas-liquid exchange. Such structures are described for example in EP-A-482 145 and WO 97/02890. Monolithic packings of this type can be produced to particular advantage with the catalyst fabrics according to the invention, whose particularly abrasion-resistant, ultrathin layers allow them to be mechanically transformed into any desired shape.

The supported catalysts according to the invention can easily be activated. At low temperatures, preferably of 20° C. to 40° C., the aluminum can be dissolved out with 1 to 20% lye, generally NaOH, to expose the active alloy phase. The treatment with lye is only carried out over a short period, preferably of 1 to 20 minutes.

By virtue of their abrasion resistance, the supported catalysts according to the invention are particularly suitable for the hydrogenation or dehydrogenation of viscous liquids on which there are high demands in respect of purity and optical clarity. It has been found that the catalysts according to the present invention are particularly suitable for improving the color index of polyhydric alcohols by hydrogenation. It is particularly preferred to employ the catalysts according to the invention in the process disclosed in the German patent application entitled "Improving the color index of polyhydric alcohols by hydrogenation", reference no. 199 63 442.4 (Applicant: BASF AG).

The patent application will now be illustrated in greater detail in the Examples below:

EXAMPLE 1

A woven wire fabric made of material no. 1.4767, with a mesh size of 0.18 mm and a wire diameter of 0.112 mm, was annealed in air at 900° C. for 3 hours. After cooling, the support fabric roughened in this way was then vapor-plated on both sides in an electron beam vaporization unit, initially at $10^{-6}$ Torr, first with a 0.2 $\mu$m thick layer of aluminum and then, under the same conditions, with a 0.044 $\mu$m thick layer of nickel. This process was repeated continuously until the total layer thickness reached 1.2 $\mu$m. After the tempering step for 3 hours under a nitrogen atmosphere, two monoliths with a height of 200 mm and a diameter of 21.5 mm were formed from the catalyst fabric. This was done by taking one smooth strip of fabric and one strip of fabric which had been corrugated beforehand by means of a gear roller, combining them, rolling them up and fixing them together by spot welding along the outside edge. The monolithic Raney nickel film catalyst obtained was placed in a 60 cm long reactor tube, where it was treated for 15 minutes with 10% sodium hydroxide solution, which was then removed by washing with water.

EXAMPLE 2

A loop reactor was filled with 500 g of HDLIN (hydro-dehydrolinalool=3,7-dimethyloct-1-yn-3-ol). By the liquid phase method with recycling, the liquid was passed over the catalyst prepared according to Example 1, the cross-sectional loading being 200 $m^3/m^2/h$. Hydrogen under a pressure of 1.1 bar was circulated simultaneously with the liquid stream. The reaction temperature was 80° C. The results obtained are listed in the Table below:

| t/min | % HDLIN[1] | % HLIN[1] | % THLIN[1] | Overall conversion of HDLIN |
|---|---|---|---|---|
| 0 | 99.70 | 0.00 | 0.00 | 0.00 |
| 30 | 96.33 | 1.57 | 1.81 | 5.18 |
| 60 | 92.74 | 3.17 | 3.80 | 10.76 |
| 90 | 89.72 | 4.52 | 5.49 | 15.47 |
| 120 | 86.44 | 5.99 | 7.30 | 20.56 |

[1]determined by gas chromatography (from the peak area)
HDLIN = hydro-dehydrolinalool
HLIN = hydrolinalool
THLIN = tetrahydrolinalool The results given in the Table show that the film catalyst according to the invention was capable of hydrogenating a total of 50 g/h of unsaturated alcohols to hydrolinalool and tetrahydrolinalool. This corresponds to a conversion of approx. 0.33 mol/h or a space-time yield of 0.35 $kg/l_{catalyst}/h$. 0.112 $m^2$ of film catalyst was used in the experiment. From the specific weight of Raney nickel catalyst used, which was 8.6 g/m², it is seen that only 0.963 g of Raney nickel alloy was present in the reactor. The specific activity was thus 2.9 mol/m²/h. No abrasion whatsoever could be established, either on the product or in the reactor.

EXAMPLE 3

A Raney nickel film catalyst obtained according to Example 1 was used in the hydrogenation of 1 kg of trimethylolpropane which had been obtained according to WO 98/28253 and had an APHA color index of 26 after distillation. The hydrogenation was carried out at a hydrogen pressure of 1.1 bar and a temperature of 140° C. After a reaction time of 15 minutes, it was possible to observe an improvement in the APHA color index to ≦6.

We claim:

1. A Raney alloy catalyst, comprising a dielectric as support and a Raney alloy layer containing aluminum and an additional metal, wherein the Raney alloy is applied to the support as a layer having a thickness of 0.01 to 100 μm and a total weight of from 0.1 to 20 g Al/m² support, and which catalyst is prepared by a process comprising
providing the support, the aluminum, and the additional metal,
vaporizing the aluminum and the additional metal under reduced pressure, and
coating the support with the aluminum and the additional metal by depositing the vaporized aluminum and the vaporized additional metal uniformly onto the support.

2. A catalyst as claimed in claim 1 which, in addition to aluminum, contains at least one metal selected from the group comprising of nickel, cobalt and copper as other components, optionally together with a promoter metal selected from the group consisting of iron, chromium, molybdenum and boron.

3. A catalyst as claimed in claim 2, wherein the additional metal is nickel.

4. A catalyst as claimed in claim 3, wherein the Raney alloy layer has a total weight from about 1 to 20 g Al/m² support in form of a knitted or woven fabric and from 1 to 3 g Ni/m² support in form of a knitted or woven fabric.

5. A catalyst as claimed in claim 3, wherein the layer thickness of the vapor-deposited aluminum ranges from 0.1 to 50 μm and of the vapor-deposited nickel from 0.1 to 10 μm.

6. A catalyst as claimed in claim 5, wherein the thickness of the aluminum layer ranges from 1 μm to 10 μm and for the nickel layer from 0.5 μm to 5 μm.

7. A catalyst as claimed in claim 1, wherein the Raney alloy layer has a total weight of 0.1 to 10 g/m² support in form of a knitted or woven fabric.

8. A catalyst as claimed in claim 1, wherein the coating is carried out by means of heat, by electron beam vaporization, by sputtering or by combinations of these methods.

9. A catalyst as claimed in claim 8, wherein the coating is carried out by electron beam vaporization.

10. A catalyst as claimed in claim 1, wherein the support is selected from the group consisting of pretreated metals, ceramic, aluminum oxide, silicon dioxide, fabrics made of asbestos substitutes, carbon fibers, organic plastics and combinations of said materials, wherein said metals are selected from the group consisting of iron, nickel, copper and steel having material Nos. 1.4767, 1.4401, 2.4601, 1.4765, 1.4847 and 1.4301, and said metals are pretreated by heating in an oxygen containing atmosphere.

11. A catalyst as claimed in claim 10, wherein the metal used as a support material is tempered in an oxygen-containing atmosphere at temperatures of 700 to 1100° C. over a period of 30 minutes to 24 hours before coating the support with the vaporized aluminum and the vaporized additional metal.

12. A catalyst as claimed in claim 11, wherein the metal is tempered at temperatures of 800 to 1000° C. and over 1 hour to 10 hours.

13. A catalyst as claimed in claim 10, wherein the organic plastics are selected from a group consisting of polyamides, polyesters, polyvinyl compounds, polyethylene, polypropylene and polytetrafluoroethylene.

14. A catalyst as claimed in claim 1 in the form of a catalyst strip or a monolithic catalyst packing produced from this catalyst strip.

15. A process for the activation of a catalyst as claimed in claim 1, wherein the catalyst is extracted with a base at low temperatures over a short period.

16. A process as claimed in claim 15, wherein the catalyst is extracted at 20 to 400° C. over 1 to 20 minutes.

17. A process for the preparation of a catalyst as claimed in claim 1, wherein the aluminum and the additional metal are applied alternately to the support by vaporization and the catalyst obtained is optionally transformed to the desired shape.

18. A process as claimed in claim 17, wherein the vaporization is effected by means of heat, by electron beam vaporization, by sputtering or by a combination of these methods.

19. A process as claimed in claim 18, wherein the vaporization is effected by electron beam vaporization.

20. A process for the preparation of a catalyst as claimed in claim 1, wherein a Raney alloy containing the aluminum and the additional metal is applied to the support by vaporizing the Raney alloy and subsequently condensing the vaporized Raney alloy onto the support.

21. A process as claimed in claim 20, wherein the vaporization is effected by means of heat, by electron beam vaporization, by sputtering or by a combination of these methods.

22. A process as claimed in claim 21, wherein the vaporization is effected by electron beam vaporization.

* * * * *

UNITED STATES PATENT AND TRADEMARK OFFICE
CERTIFICATE OF CORRECTION

PATENT NO. : 6,998,366 B2 Page 1 of 1
DATED : February 14, 2006
INVENTOR(S) : Haake et al.

It is certified that error appears in the above-identified patent and that said Letters Patent is hereby corrected as shown below:

Column 6,
Line 30, delete "400 °C" and insert -- 40°C --.

Signed and Sealed this

Second Day of May, 2006

JON W. DUDAS
*Director of the United States Patent and Trademark Office*